United States Patent
Cooper et al.

(10) Patent No.: US 9,335,745 B2
(45) Date of Patent: May 10, 2016

(54) VALVE ACTUATORS

(71) Applicants: Brian Cooper, Hampshire (GB); Peter George Clarke, Hampshire (GB)

(72) Inventors: Brian Cooper, Hampshire (GB); Peter George Clarke, Hampshire (GB)

(73) Assignee: EATON LIMITED, Titchfield Hampshire (GB)

( * ) Notice: Subject to any disclaimer, the term of this patent is extended or adjusted under 35 U.S.C. 154(b) by 0 days.

(21) Appl. No.: 14/360,634

(22) PCT Filed: Nov. 27, 2012

(86) PCT No.: PCT/EP2012/073655
§ 371 (c)(1),
(2) Date: May 26, 2014

(87) PCT Pub. No.: WO2013/079453
PCT Pub. Date: Jun. 6, 2013

(65) Prior Publication Data
US 2015/0108937 A1   Apr. 23, 2015

(30) Foreign Application Priority Data
Nov. 28, 2011   (GB) .................................. 1120464.1

(51) Int. Cl.
G05B 1/06        (2006.01)
G05B 11/01       (2006.01)
H02P 23/00       (2016.01)
F16K 31/04       (2006.01)

(52) U.S. Cl.
CPC ............ *G05B 11/011* (2013.01); *F16K 31/046* (2013.01); *H02P 23/005* (2013.01); *H02P 23/0045* (2013.01); *H02P 23/0059* (2013.01)

(58) Field of Classification Search
CPC ...................................................... G05B 11/011
USPC .................................. 318/653, 652, 638, 560
See application file for complete search history.

(56) References Cited

U.S. PATENT DOCUMENTS

| | | | |
|---|---|---|---|
| 4,417,312 A * | 11/1983 | Cronin et al. | 700/282 |
| 4,459,531 A | 7/1984 | Dumont et al. | |
| 4,584,511 A | 4/1986 | Rudich, Jr. et al. | |
| 4,845,416 A * | 7/1989 | Scholl et al. | 318/600 |
| 5,744,923 A * | 4/1998 | Strauss et al. | 318/563 |
| 6,279,870 B1 * | 8/2001 | Welz et al. | 251/129.04 |
| 7,466,100 B2 * | 12/2008 | Mueller | G05B 19/291 318/432 |
| 2009/0078898 A1 | 3/2009 | Sasaki et al. | |

FOREIGN PATENT DOCUMENTS

| | | |
|---|---|---|
| EP | 0050960 A1 | 5/1982 |
| EP | 0513994 A2 | 11/1992 |

* cited by examiner

*Primary Examiner* — David S Luo
(74) *Attorney, Agent, or Firm* — Leydig, Voit & Mayer, Ltd.

(57) ABSTRACT

A valve actuator having a drive shaft, which, in use, is configured to adjust a valve between an open position and a closed position, an AC induction motor for driving the drive shaft a contactless position sensor configured to, in use, output a signal representing an angular position of the drive shaft or the valve, and a controller configured to control the AC motor in accordance with the signal output by position sensor.

19 Claims, 1 Drawing Sheet

VALVE ACTUATORS

CROSS-REFERENCE TO RELATED APPLICATIONS

This application is a U.S. National Stage application under 35 U.S.C. §371 of International Application No. PCT/EP2012/073655, filed on Nov. 27, 2012, and claims benefit to British Patent Application No. 1120464.1, filed on Nov. 28, 2011. The International Application was published in English on Jun. 6, 2013, as WO 2013/079453 A1 under PCT Article 21(2).

FIELD

This invention relates to valve actuators.

BACKGROUND

Conventional valve actuators, such as those used in aircraft, e.g. to control components on wings, consist of a brushed DC motor that drives a 90° valve via a gear reduction assembly. The position of the valve is simply controlled by a combination of command signals and mechanically-actuated microswitches on adjustable plates actuated by a cam. The rate at which the valve opens and closes is uncontrolled and varies depending on the load and voltage supplied. This sometimes means that the rate can vary over ten times the expected rate.

Another disadvantage of such a conventional actuator is that it can only move the valve between two states: open and closed, with no means of providing intermediate states. The controllers of some current actuators use discrete position sensors to determine the position of the valve. Such actuators require manual calibration before initial use and conventional designs are non-modular. Microswitches require manual adjustment upon assembly and are difficult to set accurately and consistently. Such actuators are also prone to hysteresis and problems due to the backlash/water hammer effect, which can occur when there is a pressure surge or wave resulting when a fluid in motion is forced to stop or change direction suddenly (momentum change). Further, existing actuator technology can also have issues in terms of false indication and wear, e.g. brush wear and loss of accuracy introduced by carbon dust.

SUMMARY

An aspect of the invention provides a valve actuator, comprising: a drive shaft, which, in use, is configured to adjust a valve between an open position and a closed position; an AC induction motor configured to drive the drive shaft; a contactless position sensor, which, in use, is configured to output a signal representing an angular position of the drive shaft or the valve; and a controller configured to control the AC motor in accordance with the signal output by position sensor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
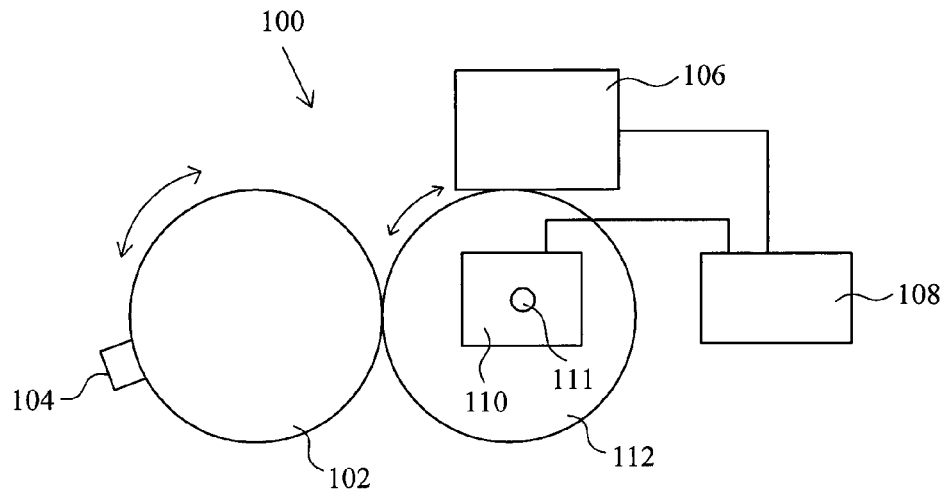
FIG. 1 is a schematic illustration of an example valve actuator.

Certain embodiments of the present invention are intended to address at least some of the issues discussed above. In some embodiments, the microswitches are replaced by non-contacting, e.g. Hall Effect, position sensor, and the brushed DC motor is replaced by an AC induction motor driven by a sinewave inverter. This can provide the ability to control the valve-adjusting velocity of the actuator by adjusting the voltage and frequency output of the inverter to control the AC motor speed. This capability may be further enhanced by the contactless sensor providing the absolute position of the valve, which allows the velocity to be controlled relative to the valve open and valve closed angles, which can give the ability to eliminate water hammer effects and surges by opening and closing the valve in a controlled manner.

In another aspect, this invention provides a valve actuator including or comprising:
- a drive shaft for, in use, adjusting a valve between an open position and a closed position;
- an AC induction motor for driving the drive shaft;
- a contactless position sensor configured to, in use, output a signal representing an (absolute) angular position of the drive shaft or the valve, and
- a controller configured to control the AC motor in accordance with the signal output by position sensor.

The controller may set a rate at which the AC motor drives the drive shaft dependent upon the position of the drive shaft. The controller may store data representing at least one drive shaft angular position. The data may represent a 'valve fully closed' position, a 'valve fully open' position and/or intermediate position(s), for example. The controller may be configured to vary a rate at which the AC motor drives the drives shaft between said stored drive shaft angular positions. The controller may be configured to vary a rate at which the AC motor drives the drives shaft in accordance with external signals/measurements, such as a pressure-based signal.

The controller may be configured to operate a plurality of different valve actuator applications. For each said valve actuator application, the controller may store data for varying drive shaft adjustment rate between specific angular positions for a said valve or a said drive shaft.

The controller may verify the position output by the position sensor by cycling power applied to the position sensor between readings.

The actuator may further include at least one (single pole magnetic) latching relay to provide, in use, a logic signal representing an open/closed position of the valve.

The position sensor may comprise a moveable component, such as a magnet, that may be fixed a gear in a drive train/gearbox for the drive shaft. The contactless position sensor may include a Hall Effect sensor.

The actuator may be configured to operate with an actuator position selection interface. The actuator may include a control circuit that is configured to periodically turn on an aircraft direction interface momentarily to assist with eliminating effects of high leakage currents in solid-state circuit breakers in the actuator position selection interface.

In another aspect, this invention provides a valve actuator controller including: a device configured to receive a signal from a contactless position sensor configured to, in use, output a signal representing an angular position of the drive shaft or the valve, and a device configured to control an AC induction motor that, in use, drives the drive shaft, in accordance with the signal output by position sensor.

In yet another aspect, this invention provides a method of operating a drive shaft for, in use, adjusting a valve between an open position and a closed position, the method including: receiving a signal from a contactless position sensor configured to, in use, output a signal representing an (absolute) angular position of the drive shaft or the valve, controlling an AC induction motor that, in use, drives the drive shaft, in accordance with the signal output by position sensor.

Whilst the invention has been described above, it extends to any inventive combination or sub-combination of any of the features disclosed herein alone or jointly with others.

Referring to FIG. 1, a schematic view of an example actuator 100 is shown. The actuator includes a main drive shaft 102 that can be rotated to move a valve 104 between a closed position and an open position. The drive shaft is moved by an AC induction motor 106 that is connected to a controller 108, which will typically comprise a Field Programmable Gate Array, such as an AGL125 V2-QN132I produced by Microsemi Corporation. Also connected to the controller is a contactless position sensor 110. In the example setup, the position sensor is based on the Hall Effect and includes a magnetic component 111 that is connected to a gear 112 in the drive train that moves the main drive shaft; however, it will be understood that this can vary, e.g. the position sensing component is directed connected to the main shaft, the valve or one or more gear in a drive train comprising several different gears. It will also be understood that other types of contactless position sensing devices could be used, e.g. permanent magnet linear contactless displacement (PLCD) sensor technology. Considering the position sensor 110 in more detail, this typically comprises an integrated circuit (having dimensions of, e.g., 6 mm×6 mm×1 mm) in addition to a moveable magnetic sensing component. An example of a suitable Hall Effect sensor is AM256Q by RLS/Renishaw, in combination with a RMM44A2C00 magnetic component (a cylindrical body having dimensions of, e.g., 4 mm diameter, 4 mm height, with a 605 Gauss magnet, for example, but it will be appreciated that this can vary). The circuit is fixed to the actuator housing (not shown) whilst the magnetic component is fixed to the gear 112 in the drive train. As the shaft rotates, the magnetic field applied to the circuit also rotates. The circuit includes an array of Hall Effect tiles and each tile produces a voltage that is dependant upon the magnetic field applied to it. The differential voltage from the tiles define the absolute position of the magnetic component with respect to the circuit.

Use of a Hall Effect position sensor has advantages in terms of eliminating the need for manual calibration/adjustment, which is a requirement with microswitches, and reduction of backlash effects. It also provides a signal capable of indicating multiple positions as standard, which, as discussed below, can allow the velocity of the drive shaft to be varied so that it is dependent upon the angular position. Further, the position sensor is contactless, is resistant to contamination and is also insensitive to magnetic fields. Such a sensor also has low power requirements (e.g. 23 mW in continuous mode, <1 mW in sampled mode). The signal output by the sensor 110 to the controller 108 may be verified by cycling the power applied to the sensor by the controller between readings.

The Hall Effect position sensor is therefore an absolute position device and in the event of an interruption in the power supply to the actuator, would normally re-validate its position on resumption of the power. However, if the system requirement is such that the actuator has independent close/open signal lines, which give a high/low logic level signal (as can be the case with aircraft systems) then this can be achieved by adding hermetic single pole magnetic latching relays, which are small and reliable, and can keep the relay closed even if power to the relay is terminated. Looking at the AC induction motor 106 in more detail, this will typically comprise a die case aluminum rotor and an encapsulated 3 phase stator. It can be driven by an electronic sinewave drive with variable frequency/voltage, adjustable actuator velocity capability and dynamic braking. The velocity can be independent of the supply voltage. The inventors have appreciated that the induction motor has advantages over conventional brushless PM motors due to low cost, simplicity and greater reliability.

Figure 2:
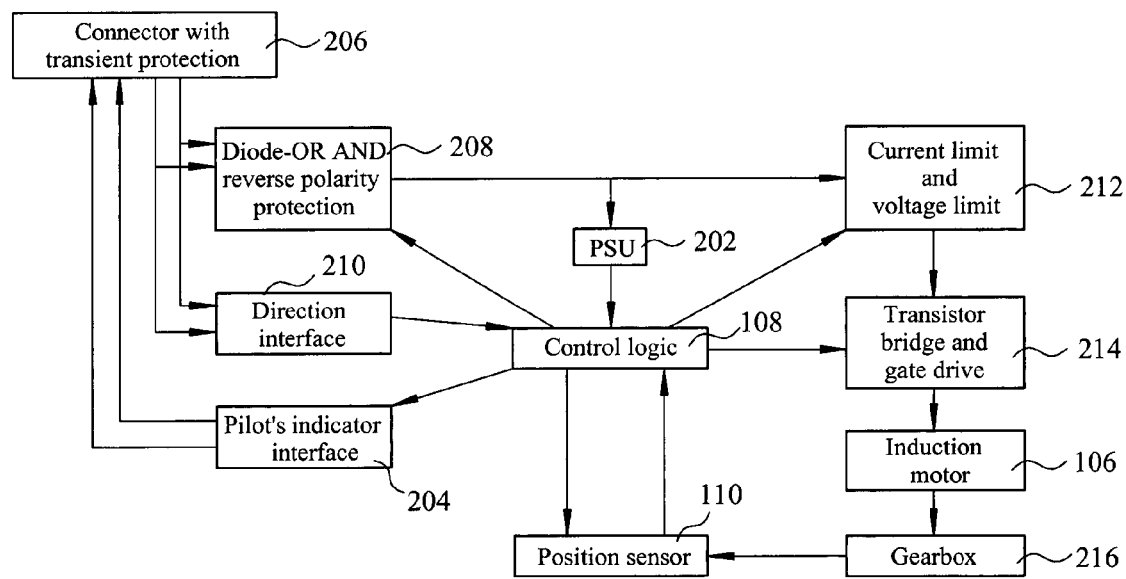
FIG. 2 is a block diagram of an architecture for the valve actuator.

FIG. 2 shows an example architecture for a valve actuator using the principles described above. The position sensor 110 is in communication with a controller 108 that receives power from a power supply unit 202. The controller is also connected to a pilot's indicator interface 204 that is linked to a connector 206 for transient protection. In some cases, the transient protection may be on a printed circuit board instead of the connector. The connector is also linked to a diode-or and reverse polarity protection unit 208 and a direction interface 210. The controller can receive data from the direction interface and transmit signals to the polarity protection unit. The controller can also transmit signals to a current limit and voltage limit unit 212, as well as a transistor bridge and gate drive 214 that is also in communication with the limit unit 212. The transistor bridge/gate drive can control the AC induction motor 106 and is connected to a gearbox 216 that includes at least one gear whose position is monitored by the position sensor 110. In some embodiments, the actuator may receive the required actuator position signals, and transmit the actuator position using a serial data bus.

Embodiments of the actuator may be useable with a position selection interface. If an aircraft uses solid-state circuit breakers to select the required actuator position, they commonly have a high leakage current in the OFF state. This high leakage current can fool the actuator into identifying an OFF state as ON. A control circuit can compensate for this whilst also keeping the power consumption to a minimum. It can do this by periodically turning on the direction interface momentarily. The interface circuit can be a low impedance circuit that eliminates the effects of the high leakage current.

The embodiments described herein can at least partially eliminate the problems discussed in the introduction to the specification. The design of the actuator is flexible and can allow a single actuator to be used in multiple applications. This can be achieved by programming the opening/closing speed of the actuator to suit specific applications/different valves. For example, the controller may be configured to set a rate at which the AC motor drives the drive shaft dependent upon the position of the drive shaft. The controller may store data representing at least one drive shaft angular position. The data may represent a 'valve fully closed' position, a 'valve fully open' position and/or intermediate position(s), for example. The controller may be configured to vary a rate at which the AC motor drives the drive shaft between said stored drive shaft angular positions. The controller may have a look-up table or the like that stores data including valve position(s) and suitable actuation velocities/rates for multiple applications. It will also be appreciated that further variations are possible, e.g. the actuation rate could be varied in accordance with external signals/measurements, such as a pressure gauge reading. Further, the actuator sensing arrangement can be used for a controlling an actuator with a different number of positions, for example, a four position actuator.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A valve actuator, comprising:
a drive shaft, which, in use, is configured to adjust a valve between an open position and a closed position;
an brushless motor configured to drive the drive shaft;
a contactless position sensor, which, in use, configured to output a signal representing an angular position of the drive shaft or the valve; and
a controller configured to control the brushless motor in accordance with the signal output by position sensor,
wherein the controller sets a rate at which the brushless motor drives the drive shaft dependent upon a position of the drive shaft, and
wherein the controller is further configured to store data representing a plurality of drive shaft angular positions and to vary a rate at which the brushless motor drives the drive shaft between the stored drive shaft angular positions.

2. The valve actuator of claim 1, wherein the data represents at least one of a valve fully closed position, a valve fully open position, and an intermediate position.

3. The valve actuator of claim 1, wherein the controller is configured to vary a rate at which the brushless motor drives the drives shaft in accordance with at least one of an external signal and an external measurement.

4. The valve actuator of claim 3, wherein the at least one of an external signal and an external measurement includes a pressure reading.

5. The valve actuator of claim 1, wherein the controller is configured to operate a plurality of different valve actuator applications.

6. The valve actuator of claim 5, where, for each valve actuator application, the controller stores data for varying drive shaft adjustment rate between specific angular positions for a respective valve or a respective drive shaft.

7. The valve actuator of claim 1, wherein the controller is configured to verify the position output by the position sensor by cycling power applied to the position sensor between readings.

8. The valve actuator of claim 1, further comprising:
a latching relay, which is configured to provide, in use, a logic signal representing an open position or a closed position of the valve.

9. The valve actuator of claim 1, wherein the position sensor includes a moveable component that is fixed to a gear in at least one of a drive train and a gearbox for the drive shaft.

10. The valve actuator of claim 9, wherein the position sensor includes a magnet.

11. The valve of claim 1, wherein the contactless position sensor includes a Hall Effect contactless sensor.

12. The valve actuator of claim 1, wherein the actuator is configured to operate with an actuator position selection interface.

13. The valve actuator of claim 12, further comprising:
a control circuit is configured to periodically turn on an aircraft direction interface momentarily to assist with eliminating effects of high leakage currents in solid-state circuit breakers in an actuator position selection interface.

14. The valve actuator of claim 1, wherein the controller is configured to vary a rate at which the brushless motor drives the drives shaft in accordance with at least two external signals.

15. The valve actuator of claim 1, wherein the brushless motor is an AC induction motor.

16. A valve actuator controller, comprising:
a device configured to receive a signal from a contactless position sensor, the contactless position sensor being configured to, in use, output a signal representing an angular position of a drive shaft or a valve and
a device configured to control a brushless motor, the brushless motor being configured to drive the drive shaft, in accordance with the signal output by position sensor,
wherein the device configured to control the brushless motor sets a rate at which the brushless motor drives the drive shaft dependent upon a position of the drive shaft, and
wherein the device configured to control the brushless motor is further configured to store data representing a plurality of drive shaft angular positions and to vary a rate at which the brushless motor drives the drive shaft between the stored drive shaft angular positions.

17. The valve actuator controller of claim 16, wherein the brushless motor is an AC inductor motor.

18. A method of operating a drive shaft, the drive shaft being configured to, in use, adjust a valve between an open position and a closed position, the method comprising:
receiving a signal from a contactless position sensor configured to, in use, output a signal representing an angular position of the drive shaft or the valve; and
controlling a brushless motor, the brushless motor configured to drive the drive shaft, in accordance with the signal output by the position sensor,
wherein controlling the brushless motor in accordance with the signal output by the position sensor comprises:
setting a rate at which the brushless motor drives the drive shaft dependent upon a position of the drive shaft,
storing data representing a plurality of drive shaft angular positions, and varying a rate at which the brushless motor drives the drive shaft between the stored drive shaft angular positions.

19. The method of method of operating a drive shaft according to claim 18, wherein the brushless motor is an AC induction motor.

* * * * *